(12) United States Patent
Jastrzembowski et al.

(10) Patent No.: US 12,305,519 B2
(45) Date of Patent: May 20, 2025

(54) TURBINE ENGINE OPERATIONAL TESTING

(71) Applicant: General Electric Company, Schenectady, NY (US)

(72) Inventors: Steven James Jastrzembowski, Cincinnati, OH (US); Thomas Edward Zieg, Blue Ash, OH (US); Jared Utah, Cincinnati, OH (US); Jeremy Seager, Cincinnati, OH (US); Michael Houpt, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/405,136

(22) Filed: Aug. 18, 2021

(65) Prior Publication Data
US 2021/0372295 A1 Dec. 2, 2021

Related U.S. Application Data

(62) Division of application No. 15/848,644, filed on Dec. 20, 2017, now Pat. No. 11,111,814.

(51) Int. Cl.
F01D 21/00 (2006.01)
F02C 9/00 (2006.01)
F02C 9/28 (2006.01)

(52) U.S. Cl.
CPC .............. F01D 21/003 (2013.01); F02C 9/00 (2013.01); F02C 9/28 (2013.01); F05D 2260/80 (2013.01); F05D 2260/821 (2013.01); F05D 2260/83 (2013.01); F05D 2270/092 (2013.01); F05D 2270/306 (2013.01); F05D 2270/44 (2013.01)

(58) Field of Classification Search
CPC .... F02C 9/26; F02C 9/263; F02C 9/28; F02C 9/32; F05D 2260/80; F05D 2260/81; F05D 2260/82; F05D 2260/821; F05D 2260/83; F05D 2270/44; F05D 2270/051; F05D 2270/082; F05D 2270/09; F05D 2270/092; F01D 21/003
See application file for complete search history.

(56) References Cited

U.S. PATENT DOCUMENTS

| | | |
|---|---|---|
| 3,832,846 A | 9/1974 | Leeson |
| 6,704,630 B2 | 3/2004 | Ostrom et al. |
| 6,851,303 B2 | 2/2005 | Parfitt et al. |
| 7,762,125 B2 | 7/2010 | Howlett et al. |
| 7,843,354 B2 | 11/2010 | Holt et al. |
| 8,661,880 B2 | 3/2014 | Block et al. |
| 8,744,634 B2 | 6/2014 | Purani et al. |

(Continued)

Primary Examiner — Arun Goyal
(74) Attorney, Agent, or Firm — Smith Gambrell & Russell LLP

(57) ABSTRACT

Systems and methods for conditionally performing engine operational tests for a turbine engine are provided. A system comprising at least one processor can be configured to obtain sensor data associated with at least one sensor for a turbine engine. The sensor data identifies a current fuel flow associated with the turbine engine. The system can determine a predicted fuel flow of the turbine engine based at least in part on the current fuel flow and a fuel flow reduction associated with an engine operational test. The system can compare the predicted fuel flow to at least one threshold. The system can selectively initiate the engine operational test based on comparing the predicted fuel flow to the at least one threshold.

17 Claims, 6 Drawing Sheets

(56) References Cited

U.S. PATENT DOCUMENTS

| | | |
|---|---|---|
| 8,904,804 B2 | 12/2014 | Tezuka et al. |
| 9,045,220 B2 | 6/2015 | Yamasaki |
| 9,470,152 B2 | 10/2016 | MacDonald et al. |
| 2012/0210725 A1 | 8/2012 | Courtie et al. |
| 2015/0027412 A1 | 1/2015 | Henson |
| 2017/0138781 A1 | 5/2017 | Adibhatla |
| 2017/0328567 A1 | 11/2017 | Crowley et al. |

TURBINE ENGINE OPERATIONAL TESTING

CROSS REFERENCE TO RELATED APPLICATIONS

The present application is a divisional of U.S. application Ser. No. 15/848,644, filed Dec. 20, 2017, the disclosure of which is incorporated herein by reference in its entirety.

FIELD

The present disclosure relates generally to aerial vehicles.

BACKGROUND

An aerial vehicle can rely on one or more engines such as jet turbine engines, turbofan engines, and turbojet engines to control the aerial vehicle. An engine control system is provided that allows the pilot to control the amount of power and/or thrust generated by the engine. Many modern control systems, for example, may include an input lever that communicates pilot input to one or more engine controllers. The engine controllers generate commands to regulate the amount of power generated by the engine based on the pilot input. If the turbine engine does not respond to the controller commands in an anticipated manner, a safety issue may arise. Accordingly, many control systems attempt to detect thrust control malfunctions, and provide an automated response. For example, engine control systems may shut down or reduce engine thrust in response to a detected thrust control malfunction.

To ensure proper operation of thrust control malfunction response functions, tests of these control systems are often performed. Traditionally, these tests are only performed if one or more engine bleeds are being executed for the turbine engine.

BRIEF DESCRIPTION

Aspects and advantages of the disclosed technology will be set forth in part in the following description, or may be obvious from the description, or may be learned through practice of the disclosure.

According to example embodiments of the disclosed technology there is provided a computer-implemented method of reducing combustor blowout during turbine engine testing. The method comprises receiving, by a system comprising at least one processor, sensor data associated with at least one sensor for a turbine engine. The sensor data identifies a current fuel flow associated with the turbine engine. The method includes determining, by the system, a predicted fuel flow of the turbine engine based at least in part on the current fuel flow and a fuel flow reduction associated with an engine operational test, comparing, by the system, the predicted fuel flow to at least one threshold, and selectively initiating, by the system, the engine operational test. The engine operation test is selectively initiated based on comparing the predicted fuel flow to the at least one threshold.

According to example embodiments of the disclosed technology there is provided a system, comprising one or more sensors configured to generate sensor data including one or more engine parameters of a turbine engine, and one or more processors. The one or more processors are configured to determine a current fuel flow of the turbine engine, determine a predicted fuel flow of the turbine engine based on activation of a flow reduction valve of a fuel control system associated with the turbine engine, verify whether the predicted fuel flow satisfies at least one criteria associated with lean blowout of a combustor of the turbine engine, and activate the reduction valve of the fuel control system in response to the predicted fuel flow satisfying the at least one criteria.

According to example embodiments of the disclosed technology there is provided a non-transitory computer-readable medium storing computer instructions, that when executed by one or more processors, cause the one or more processors to perform operations. The operations comprise determining a current fuel flow rate associated with a turbine engine, inputting the current fuel flow rate into one or more models to determine a predicted fuel flow rate of the turbine engine, determining if the predicted fuel flow rate satisfies at least one threshold criterion associated with a control malfunction system of the turbine engine, and testing the control malfunction system if the predicted fuel flow rate satisfies the threshold criterion.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
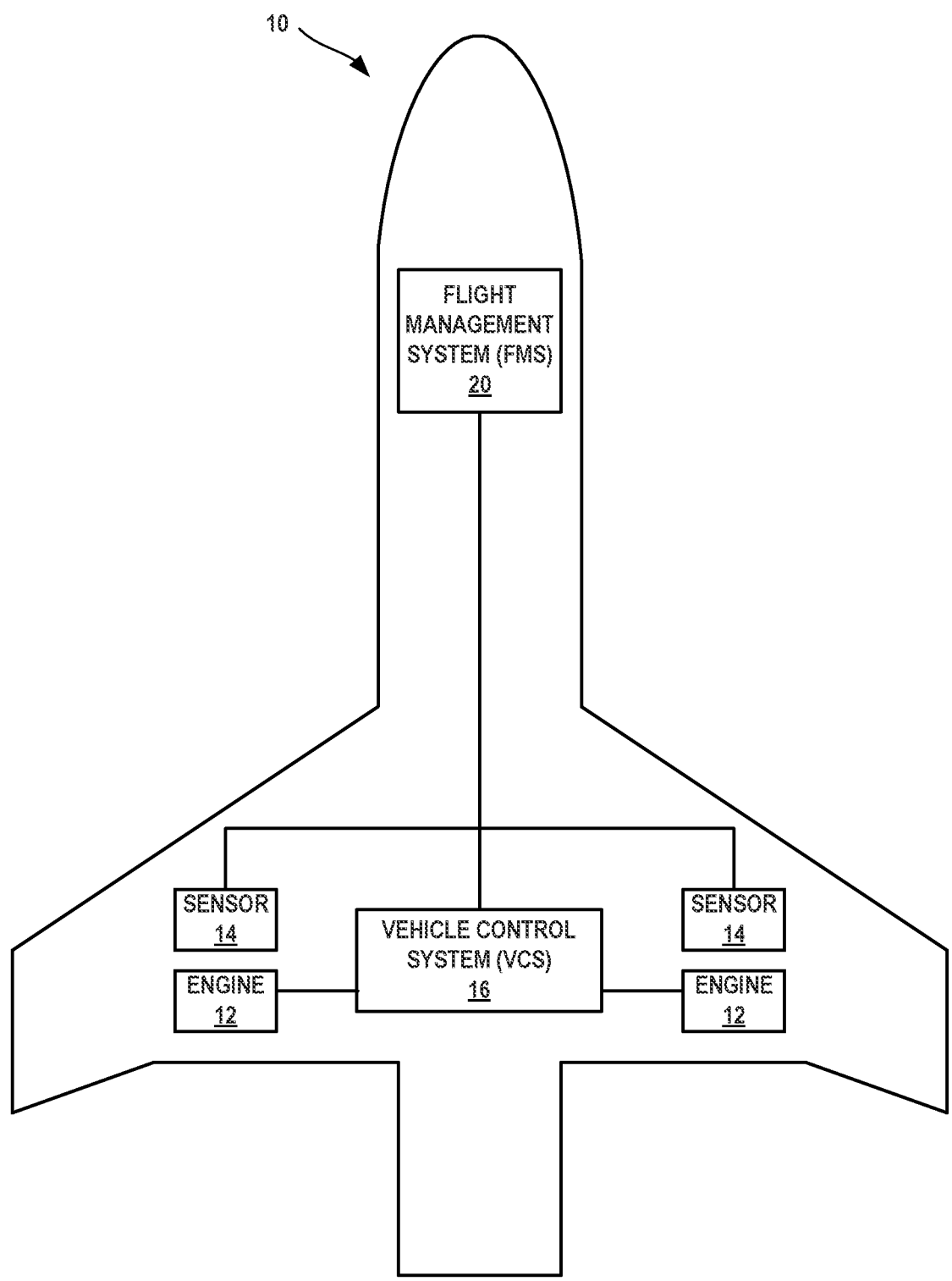
FIG. 1 depicts a block diagram of an example of an aerial vehicle in which embodiments of the present disclosure may be practiced.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed systems and methods for avoiding combustor blowout in gas turbine engines, and more particularly, to systems and methods for selectively performing engine operational tests based on predicted fuel flow to the gas turbine engine. According to example embodiments, a test system is provided that receives sensor data from one or more sensors associated with the jet turbine engine. The test system determines a current fuel flow associated with the jet turbine engine from the sensor data. The test system uses the current fuel flow to determine a predicted fuel flow of the turbine engine if a engine operational test is activated for the turbine engine. The test system compares the predicted fuel flow with one or more thresholds such as a minimum fuel flow to avoid lean blowout (LBO) of the combustor section of the jet turbine engine. If the predicted fuel flow satisfies the threshold, such as by meeting the minimum fuel flow requirement, the test system activates the engine operational test of the turbine engine. If the predicted fuel flow does not satisfy the threshold, such as by being below the minimum fuel flow requirement, the system can skip the engine operational test in an effort to avoid lean blowout. The test system can additionally generate an identifier that the engine operational test was skipped in some implementations.

According to example embodiments, the test system performs the predicted fuel flow analysis prior to initiating an engine operational test that results in a reduced fuel flow to the turbine engine. For example, the test system may determine whether the predicted fuel flow satisfies a threshold prior to testing a thrust control response system of an aerial vehicle. The thrust control response system may respond to malfunctions of the thrust control system by reducing engine thrust. More particularly, the test system may determine whether the predicted fuel flow satisfies a threshold prior to initiating a test of a cutback function associated with a thrust control malfunction accommodation (TCMA) system of the turbine engine. The TCMA cutback function may provide a reduced fuel flow to the jet turbine engine in response to a TCMA command. For example the TCMA system may include a flow reduction device such as a flow reduction valve to reduce fuel flow to the turbine engine over a range of input commands. The range of input commands may result in different fuel metering valve positions to regulate engine thrust. The flow reduction valve may reduce fuel flow over the range of fuel metering valve positions. Accordingly, the test system may determine whether the predicted fuel flow during a test of the flow reduction valve is at or above a minimum fuel flow to provide a lean blowout margin.

According to example embodiments of the disclosed technology, the test system is configured to determine a current fuel flow associated with the jet turbine engine prior to initiating an engine operational test. For example, the test system can be configured to receive sensor data representing a current fuel flow associated with the turbine engine. For example, the current fuel flow may be a current fuel flow rate represented by one or more engine parameters of the sensor data. The test system may receive the sensor data directly from the one or more sensors, or may receive the sensor data from a memory or other storage location. In some examples, the test system can be configured to determine a current fuel flow associated with the turbine engine using the sensor data or through other techniques. For example, the system may derive a current fuel flow from one or more other engine parameters.

According to some implementations of the disclosed technology, the test system can be configured to receive sensor data identifying one or more additional engine parameters. The test system can predict a fuel flow during the maintenance test based on these one or more additional engine parameters in addition to or in place of the current fuel flow. For example, the test system may be configured to determine a predicted fuel flow based on one or more of a fuel split ratio to fuel nozzles, a fuel temperature, an engine core speed, and a high pressure compressor discharge pressure.

In accordance with some embodiments, the test system is configured to utilize one or more engine and/or fuel flow models to determine a predicted fuel flow rate. For example, the test system can input a current fuel flow rate to the one or more models, and receive as an output a predicted fuel flow rate. In other examples, the test system can input the current fuel flow rate and one or more additional engine parameters to the one or more models and receive a predicted fuel flow rate.

In accordance with example embodiments, the test system is configured to compare the predicted fuel flow rate with one or more thresholds in order to avoid lean blowout of the combustor section of the turbine engine. In some examples, the threshold is a minimum fuel flow to maintain a lean blowout margin. In some embodiments, the threshold is variable based on engine operating conditions or a current engine state. For example, the minimum fuel flow rate may change based on engine operating parameters. In other examples, a constant threshold can be used.

Embodiments of the disclosed technology provide a number of technical benefits and advantages, particularly in the area of turbine engine operation. As one example, the disclosed technology provides for more stable turbine engine performance by ensuring that future operating conditions will not cause an undesirable engine state. The disclosed technology can predict a fuel flow to the engine prior to performing a scheduled engine operation test, such as a test of the thrust control malfunction system utilized with many aircraft. By determining whether the predicted fuel flow satisfies minimum fuel flow rates during the scheduled operation, the system can avoid initiating an operation that will cause an undesirable engine state such as lean blowout of the combustor.

Embodiments of the disclosed technology additionally provide a number of technical benefits and advantages in the area of computing technology. For example, the disclosed system can obtain sensor data identifying measured engine parameters of a turbine engine and automatically determine whether performance of an engine operational test will cause an undesirable engine state. A computing system implemented in accordance with the disclosed technology can determine a predicted engine state, such as a predicted fuel flow based on measured engine parameters. In this manner, the computing system can more accurately and efficiently determine an engine state to avoid performing a maintenance operation that can cause an undesirable engine state. By way of example, a computing system can determine a predicted fuel flow rate to more accurately predict whether sufficient lean blowout margin exists, when compared with traditional techniques that may look at indirect factors. For example, by predicting a fuel flow rate a more accurate representation of the lean blowout margin can be provided, when compared with techniques that may look at indirect factors such as whether bleed is being performed.

FIG. 1 depicts a block diagram of an example aerial vehicle 10 according to example embodiments of the present disclosure. The aerial vehicle 10 can include one or more engines 12 that can cause operations, such as propulsion of and/or onboard power generation for the aerial vehicle 10. An engine 12 can be a gas turbine engine such as a jet turbine engine, turboprop engine, turbofan engine, a turbo shaft engine, or any other suitable engine.

The aerial vehicle 10 can include an onboard computing system including one or more onboard computing devices that can be associated with, for example, an avionics system. The one or more onboard computing devices can be coupled to a variety of systems on the aerial vehicle 10 over one or more communication networks including for example or more data buses and/or combinations of wired and/or wireless communication links. In example embodiments, the avionics system may include a flight management system (FMS) 20 and vehicle control system (VCS) 16 as shown in FIG. 1. It will be appreciated that an FMS 20 and VCS 16 are broadly depicted by way of example only in FIG. 1 to represent the many varied control systems that may be implemented by onboard computing devices of the aerial vehicle.

The onboard computing device(s) may provide or implement the flight management system 20. In example embodiments, the flight management system can automate the tasks of piloting and tracking the flight plan of the aerial vehicle 10. It should be appreciated that the flight management system can include or be associated with any suitable number of individual microprocessors, power supplies, storage devices, interface cards, auto flight systems, flight management computers, and other standard components. The flight management system can include or cooperate with any number of software programs (e.g., flight management programs) or instructions designed to carry out the various methods, process tasks, calculations, and control/display functions necessary for operation of the aerial vehicle 10.

The onboard computing device(s) can also provide or implement one or more aerial vehicle control system(s) 16. The aerial vehicle control system(s) 16 can be configured to perform various aerial vehicle operations and control various settings and parameters associated with the aerial vehicle 10. For instance, the aerial vehicle control system(s) 16 can be associated with the one or more engine(s) 12 and/or other components of the aerial vehicle 10. The aerial vehicle control system(s) 16 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, a flight management system, a landing system, and other systems.

In some implementations, the vehicle control system 16 includes one or more engine controllers. For example, vehicle control system 16 may include an electronic engine controller (EEC) for each engine 12 in some embodiments. In other examples, vehicle control system 16 may include a Full Authority Digital Engine Control (FADEC) system. A FADEC system is often used for aerial vehicles having two or more engines because the FADEC system dynamically controls the operation of each gas turbine engine and requires minimal, if any, supervision from the pilot. The vehicle control system may include other control systems such as a fuel control system including one or more fuel controllers configured to control fuel flow for the one or more engines 12.

The aerial vehicle 10 can additionally include one or more sensors 14. The one or more sensors 14 can be used to detect one or more parameters related to the engine(s) 12, aerial vehicle 10, and/or atmosphere external to the aerial vehicle. The one or more sensors 14 can communicate the one or more detected parameters to the flight management system (FMS) 20 and/or vehicle control system (VCS) 16. In some implementations, the one or more sensors and/or FMS 20 and/or VCS 16 can communicate parameters to one or more external components.

In example embodiments, the onboard computing device(s) can be in communication with a display system, such as the flight displays in a cockpit of the aerial vehicle 10. More specifically, the display system can include one or more display device(s) configured to display or otherwise provide information generated or received by the onboard computing system. In example embodiments, information generated or received by the onboard computing system can be displayed on the one or more display device(s) for viewing by flight crew members of the aerial vehicle 10. The display system can include a primary flight display, a multipurpose control display unit, or other suitable flight displays commonly included within the cockpit of the aerial vehicle 10.

The vehicle control system 16 and flight management system 20 may generally include one or more processor(s) and associated memory configured to perform a variety of computer-implemented functions, such as various methods, steps, calculations and the like disclosed herein. In some examples, control systems such as an engine control system and/or fuel control system may be programmable logic devices, such as a Field Programmable Gate Array (FPGA), however they may be implemented using any suitable hardware and/or software.

The term processor may generally refer to integrated circuits, and may also refer to a controller, microcontroller, a microcomputer, a programmable logic controller (PLC), an application specific integrated circuit (ASIC), a Field Programmable Gate Array (FPGA), and other programmable circuits. Additionally, the memory described herein may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Any one or a combination of the flight management system and vehicle control system may also include a communications interface. The communications interface can include associated electronic circuitry that is used to send and receive data. More specifically, the communications interface can be used to send and receive data between any of the various control systems. Similarly, a communications interface at any one of the controllers may be used to communicate with outside components such as another aerial vehicle and/or ground control. A communications interface may be any combination of suitable wired or wireless communications interfaces.

The numbers, locations, and/or orientations of the components of example aerial vehicle 10 are for purposes of illustration and discussion and are not intended to be limiting. Those of ordinary skill in the art, using the disclosures provided herein, shall understand that the numbers, locations, and/or orientations of the components of the aerial vehicle 10 can be adjusted without deviating from the scope of the present disclosure.

A gas turbine engine can include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. In a traditional jet engine, the exhaust gases typically provide all of the thrust for the engine. In a turboprop engine, the exhaust gases drive the turbine section, which generates power that is mechanically transmitted to a propeller which provides the majority of thrust for the engine. In a turbofan engine, some of the combustion air bypasses the turbine and drives a ducted fan which together with the exhaust gases of the turbine section generate thrust.

Vehicle control system 16 may execute operations to regulate fuel flow to the combustor of a turbine engine. For example, an engine controller may include a thrust control system including a throttle input device that is provided to receive pilot input defining a desired thrust level. For example, the throttle input device may be movable between a maximum power setting, and an idle or maximum reverse setting for the turbine engine. The pilot inputs are communicated to the engine controller which generates commands to control the engine, such as by regulating the fuel flow. For example, the commands from the vehicle control system may cause actuators on the gas turbine to, for example, adjust one or more valves between the fuel supply and combustors that regulate the flow and type of fuel. The commands may also cause actuators to adjust inlet guide vanes on the compressor and other control settings on the gas turbine.

A thrust control malfunction may exist when the turbine engine fails to respond appropriately to commands from the engine control system. Many vehicle control systems provide a function to accommodate malfunctions or other errors associated with the engine control system. For example, some engine control systems may shut down a turbine engine in response to a detected malfunction. In other examples, a vehicle control system may cutback thrust generated by the turbine engine in response to a detected malfunction. For example, some vehicle control systems may regulate or decrease the amount of fuel flow to the turbine engine in response to a detected malfunction.

Figure 2:
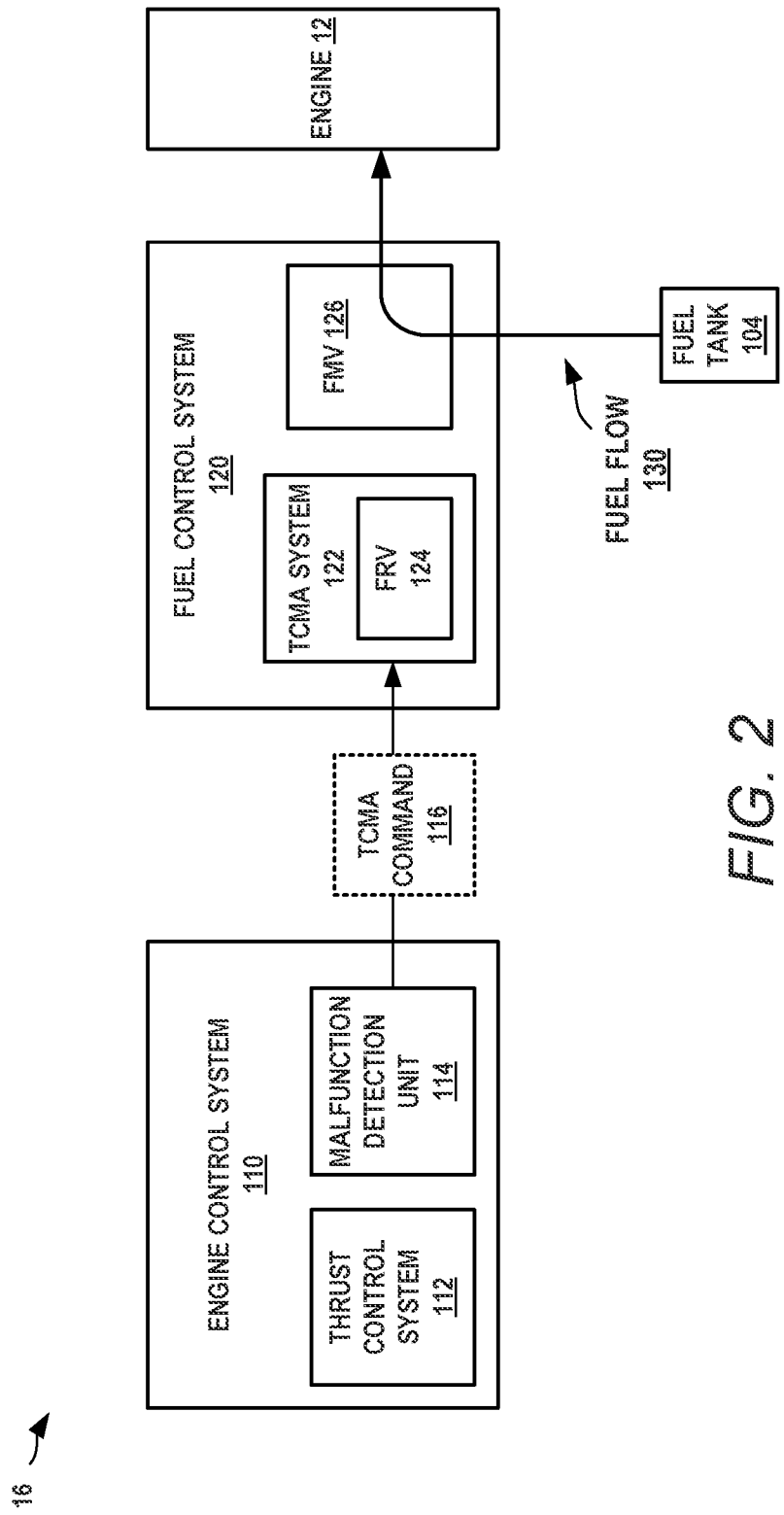
FIG. 2 depicts a block diagram of an example engine control system in accordance with example embodiments of the present disclosure.

FIG. 2 is a block diagram depicting an example vehicle control system 16 that includes thrust control management. More particularly, the vehicle control system 16 includes an engine control system 110 and a fuel control system 120 for controlling operation of engine 12. Engine control system 110 includes a thrust control system 112 and a malfunction detection unit 114. Thrust control system 112 may include any number and type of input devices configured to receive pilot input and to generate a corresponding output representing a desired thrust level. By way of example, the output of thrust control system 112 may be provided to fuel control system 120 to regulate a fuel flow 130 between a fuel tank 104 and engine 12. More particularly, fuel control system 120 can include a fuel metering valve (FMV) 126 that can respond to commands from engine control system 110 to regulate the fuel flow between fuel tank 104 and engine 12. It will be appreciated that any systems and techniques for adjusting the fuel flow to a turbine engine may be used in accordance with the present disclosure.

Malfunction detection unit 114 is configured to detect any malfunction or error associated with the thrust control system 112. Although shown as part of the engine control system 110, malfunction detection unit 114 may be incorporated within thrust control management accommodation (TCMA) system 122 in various embodiments. In response to a detected malfunction, malfunction detection unit 114 can issue a TCMA command 116 to TCMA system 122. In response to the TCMA command 116, TCMA system 122 can reduce fuel flow to engine 12. Various mechanisms may be provided for reducing the fuel flow to an engine in response to a TCMA command. In one example, the TCMA system 122 includes a flow reduction valve (FRV) 124 configured to reduce the fuel flow 130 to engine 12. Flow reduction valve 124 may be actuated in response to TCMA command 116 to reduce the amount of fuel flow 130. Although shown separate from fuel flow 130, it will be appreciated that FRV 124 may be provided in the fuel flow path before or after FMV 126 in various embodiments. In other examples, FRV 124 may be a pressure-regulating valve configured to indirectly alter the flow of fuel between fuel tank 104 and engine 12. In some implementations, FRV 124 can be a servo valve or a control servo valve. It will be appreciated that many systems and techniques for reducing the fuel flow to a turbine engine may be used in accordance with the present disclosure.

In order to ensure safe operation of an aerial vehicle 10, TCMA system 122 may be periodically tested. For example, many commercial airliners may test the functionality of a TCMA system 122 after a predetermined number of flight cycles, which may be equal to one or more. Testing the TCMA system 122 may include actuating flow reduction valve FRV 124 or another flow reduction device provided as part of the TCMA system 122. Actuating the flow reduction valve 124 may result in a reduced fuel flow 130 to the engine 12. The reduced fuel flow that results from testing the TCMA system may cause unintentional blowout of the turbine engine.

During normal operation of the turbine engine, the flame temperature and fuel mix are regulated in order to control the production of oxides of nitrogen (in NOx) during the combustion process. For example, fuel and air can be premixed into a uniform mixture that may avoid creating areas of high combustion temperature. Additionally, the engine may be operated below certain temperatures to avoid high levels of NOx production. In this manner, vehicle control system 16 can maintain NOx and carbon monoxide (CO) emissions within predefined limits, and can maintain the combustor firing temperature within predefined temperature limits. Example parameters that may be used include, but are not limited to, current compressor pressure ratio, compressor discharge temperature, ambient specific humidity, inlet pressure loss, and turbine exhaust back pressure.

A margin is typically provided in combustion systems such that under-fire events will not have a significant negative effect on engine performance. In some modern engines, however, the margin can be small (or tight) such that under-fire may result in combustion dynamics or a loss of flame. Some gas turbines may operate at very lean fuel/air (F/A) ratios that are close to a lean blowout (LBO) boundary in order to maintain low NOx emissions. If the fuel/air ratio is leaner than a corresponding LBO boundary, blowout of the engine flame in the combustor may occur. A blowout may occur in one or more cans of the combustor. Lean blowout, or weak extinction, may refer to the point at which a fuel/air mixture is no longer flammable. For some systems, weak extinction may refer to the point at which there is a significant drop in the combustion efficiency and/or complete extinction of the flame.

Some aerial vehicles have included conditional test mechanisms that only perform a test of the TCMA system based on engine bleed criteria. For example, some techniques attempt to determine that a sufficient fuel flow is present by determining whether an environmental control system (ECS) bleed is being performed. An ECS bleed can be expected to increase the fuel flow to the engine. As such, some techniques have verified that a bleed is being performed in order to ensure that a minimum fuel flow is present. If the engine bleed is currently being performed, such as by drawing bleed air for the environmental control system, the test may be performed. If the engine bleed is not currently being performed the TCMA test may be skipped.

Techniques that rely on engine bleed criteria may be inefficient as suitable conditions can exist for performing an engine operational test even when a bleed is not being performed. For example, it is possible that sufficient fuel flow may be present even without engine bleed being performed. A generator load or other factor may result in engine flow sufficient to conduct a TCMA test. Using an engine bleed or other approximation technique may lead to skipping a TCMA test when in fact the test can be performed while maintaining sufficient fuel flow to the turbine engine to avoid blowout.

In accordance with embodiments of the disclosed technology, a TCMA test can be performed conditionally on the basis of the predicted fuel flow of the turbine engine during the test. For example, a TCMA test unit can be provided as part of flight management system 20 and/or vehicle control system 16. The TCMA test unit can be configured to conditionally perform a TCMA test based on a predicted engine fuel flow.

Figure 3:
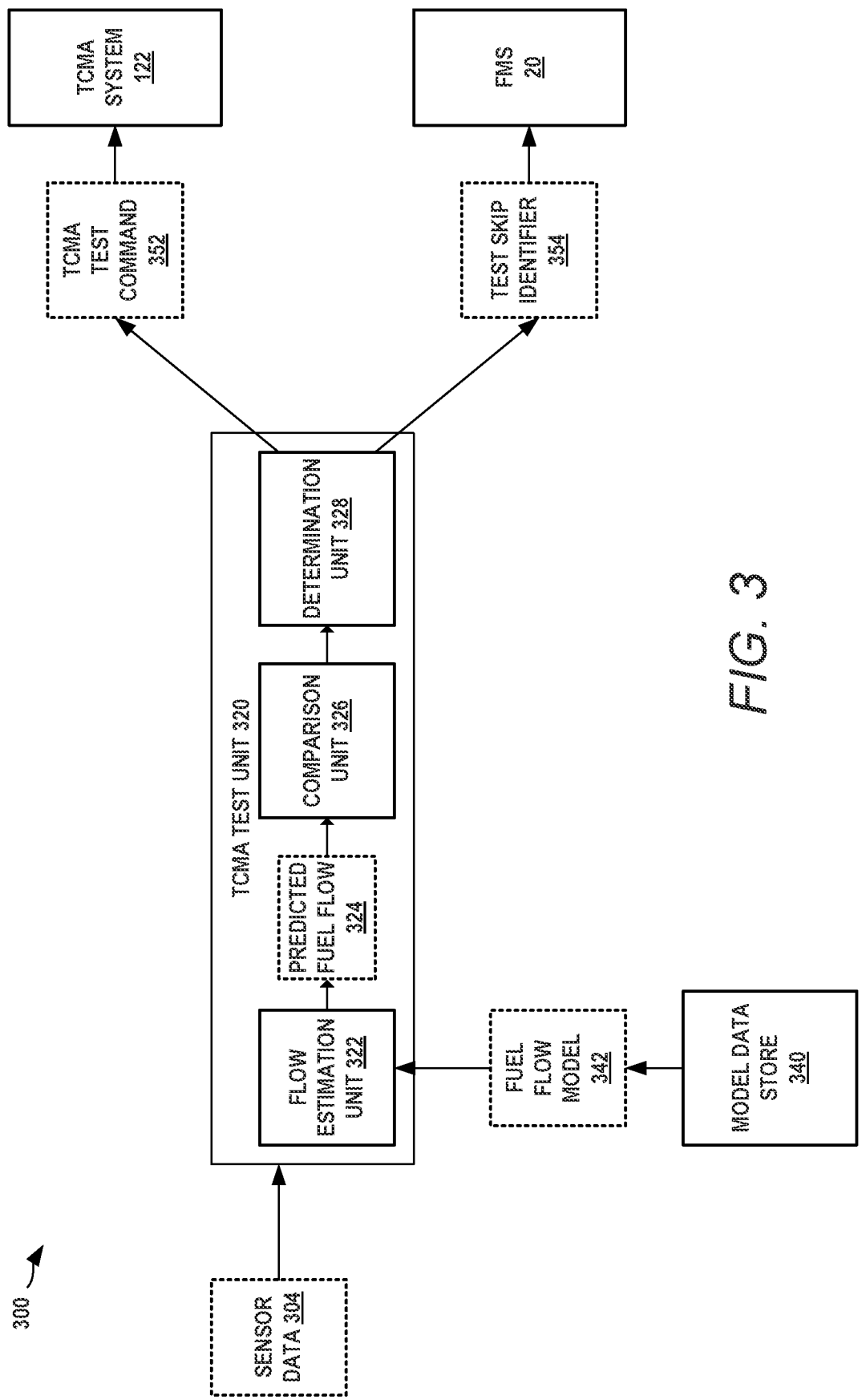
FIG. 3 depicts a block diagram of a thrust control management accommodation test unit in accordance with example embodiments of the present disclosure.

FIG. 3 is a block diagram depicting a computing system 300 of aerial vehicle 10 in accordance with one embodiment of the disclosed technology. Computing system 300 includes a TCMA test unit 320, which may be implemented using one or more computing devices including one or more processors and memory coupled to the one or more processors. In one embodiment, TCMA test unit 320 is provided as part of flight management system 20. In another embodiment, TCMA test unit 320 is provided as part of vehicle control system 16.

Sensor data 304 is received by TCMA test unit 320. Sensor data 304 may include one or more engine parameters including at least one engine parameter identifying a fuel flow associated with engine 12. As another example, the fuel flow may be derived from the sensor data, such as by determining a fuel flow rate from one or more other engine parameters received in the sensor data. The fuel flow may be represented by a fuel flow rate in one example, although any identification of the fuel flow may be used. Sensor data may be received directly by TCMA test unit 320 from sensors 14, or it may be received from a database or other data storage device. In FIG. 3, sensor data 304 is received at a flow estimation unit 322.

Flow estimation unit 322 additionally receives a fuel flow model 342 from model data store 340. Model data store 340 may store one or more engine and or fuel flow models associated with engine 12. Model data store 340 can store data including fuel flow model 342 in a format that can be accessed by the one or more processors. Fuel flow model 342 can include one or more table(s), function(s), algorithm(s), model(s), equation(s), etc. according to example embodiments of the present disclosure. Model data stores 340 may include any suitable data storage technology such as databases, files, data structures and the like configured to store the associated information. In some embodiments, the data store may comprise any combination of one or more of a hard disk drive, RAM (random access memory), ROM (read only memory), flash memory, etc. In some embodiments, the aerial vehicle 10 may include a computer model data store 340 that may provide information to the TCMA test unit 320 and may also store results from the TCMA test unit 320, such as a test skip identifier 354.

The engine and fuel flow models may indicate various parameters associated with the engine at different operating conditions. For example the one or more models may indicate an expected fuel flow rate of the turbine engine based on the set of operating conditions. Flow estimation unit 322 can access one or more fuel flow models 342. In example embodiments, flow estimation unit 322 can input the current fuel flow from sensor data 304 into the one or more fuel flow models 342. Flow estimation unit 322 can receive from the fuel flow model(s) one or more predicted fuel flow rates based on performing a TCMA test.

For example, fuel flow model 342 may be configured to provide a predicted fuel flow rate based on a current fuel flow rate and a TCMA test condition. The TCMA test condition can correspond to or represent a TCMA test being performed at the current fuel flow rate. Flow estimation unit 322 may receive the predicted fuel flow rate and provide a predicted fuel flow 324 to a comparison unit 326.

In example embodiments, comparison unit 326 can be configured to compare the predicted fuel flow 324 with one or more thresholds. In one example, the one or more thresholds include a minimum fuel flow rate. The minimum fuel flow rate may be constant or variable rate in various embodiments. Comparison unit 326 compares the predicted fuel flow 324 with the minimum fuel flow to determine whether the predicted fuel flow is at or above the minimum fuel flow rate. Comparison unit 326 can determine whether the predicted fuel flow 324 satisfies a threshold criterion associated with a TCMA test.

Comparison unit 326 provides a result of the comparison to the determination unit 328. For example, comparison unit 326 may provide an indication as to whether the predicted fuel flow rate satisfies the threshold. Determination unit 328 can be configured to generate one or more commands and/or identifiers based on the result provided by comparison unit 326. For example, if the predicted fuel flow rate is above the one or more thresholds, determination unit 328 may generate a TCMA test command 352. Determination unit 328 can provide the TCMA test command 352 to TCMA system 122. In response to the TCMA test command, the TCMA system can activate the TCMA test. If the predicted fuel flow rate does not satisfy the one or more thresholds, determination unit 328 can generate a test skip identifier 354 indicating that the TCMA test was skipped. In example embodiments, determination unit 328 may provide the test skip identifier 354 to flight management system 20. In one example, the test skip identifier is a flag, however, any suitable indication that a TCMA test was skipped can be used. The identifier can be stored by the flight management system (FMS) 20 in order to track a number of times the TCMA test was skipped.

In one example, the flight management system 20 may initiate a maintenance operation after predetermined number of TCMA tests are skipped.

TCMA test unit 320, including flow estimation unit 322, comparison unit 326, and/or determination unit 328, may be implemented as hardware, software, or as a combination of hardware and software. The software may be stored as processor readable code and implemented in a processor, as processor readable code for programming a processor for example. In some implementations, one or more of the components can be implemented individually or in combination with one or more other components as a packaged functional hardware unit (e.g., one or more electrical circuits) designed for use with other units, a portion of program code (e.g., software or firmware) executable by a processor that usually performs a particular function of related functions, or a self-contained hardware or software component that interfaces with a larger system, for example. Each unit, for example, may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, these components may include software stored in a processor readable device (e.g., memory) to program a processor for flight management system 20 and/or 16 to perform the functions described herein. The architecture depicted in FIG. 3 is one example implementation. These various computing-based elements may be configured at a single computing device, or may be distributed across multiple computing devices.

Although FIG. 3 describes a TCMA test unit incorporated within the aerial vehicle, this is not required. For example, a TCMA test unit may be implemented externally to an aerial vehicle. In some implementations, a ground-based control system can implement the TCMA test unit. Sensor data can be communicated in the aerial vehicle to the external TCMA test unit. The external TCMA test unit can determine whether the test should be performed and provide one or more return commands to the aerial vehicle.

Figure 4:
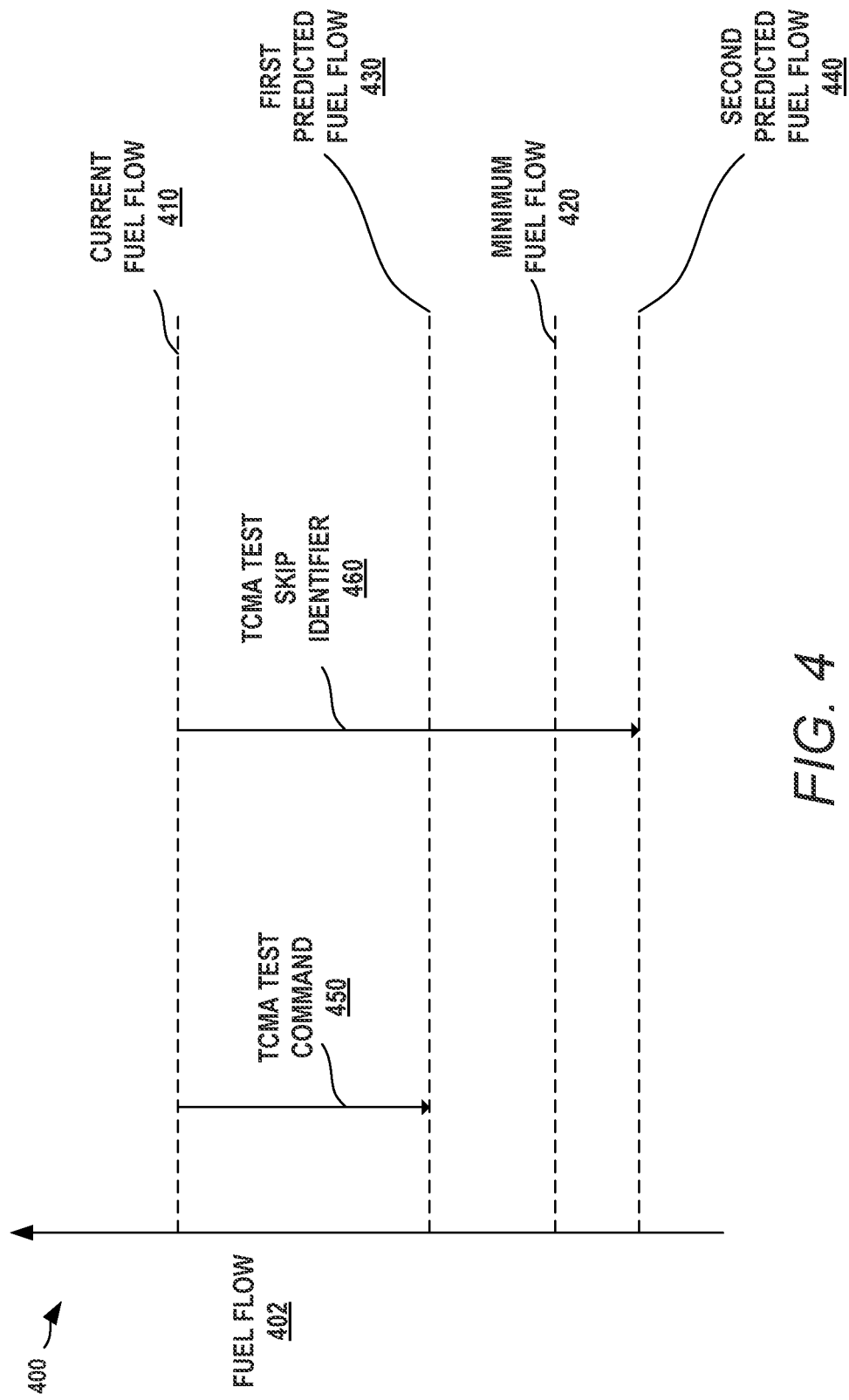
FIG. 4 is a graphical representation of a minimum fuel flow threshold for performing a thrust control management accommodation test in accordance with example embodiments of the present disclosure.

FIG. 4 is a graphical representation 400 depicting a minimum fuel flow threshold that can be used in accordance with example embodiments of the disclosed technology. Fuel flow 402 is graphically depicted as increasing from the bottom to the top, relative to the page. A current fuel flow 410 is depicted, having a maximum fuel flow level amongst the depicted fuel flows. A minimum fuel flow 420 threshold is depicted. The minimum fuel flow 420 may represent a fuel flow requirement to provide a lean blowout (LBO) margin for the combustor. A fuel flow at or above the minimum fuel flow 420 can be expected to provide a sufficient fuel/air ratio to avoid lean blowout. A fuel flow below the minimum fuel flow 420, however, can be expected to provide a fuel/air ratio that may result in lean blowout.

A first predicted fuel flow 430 is depicted, corresponding to a predicted fuel flow with a TCMA test function active under a first set of engine operating conditions. The first predicted fuel flow corresponds to a predicted fuel flow during a TCMA test function. In example embodiments, the TCMA test function may include actuating a fuel reduction valve. As FIG. 4 depicts, the first predicted fuel flow 430 with the TCMA test active is greater than the minimum fuel flow 420. In such a situation, the TCMA test unit may determine that the TCMA test should be performed. Accordingly, a TCMA test command can be generated by the TCMA test unit and provided to the TCMA system. A TCMA test can then be executed. A TCMA test command 450 can be provided in one embodiment.

A second predicted fuel flow 440 is depicted, corresponding to a predicted fuel flow with the TCMA test function active during a second set of operating conditions. As FIG. 4 depicts, the second predicted fuel flow 440 is less than the minimum fuel flow 420. In this situation, the TCMA test unit may determine that the TCMA test should not be performed. Accordingly, the TCMA test unit can generate a TCMA test skip identifier 460. The TCMA test may can be skipped or otherwise not performed in order to avoid lean blowout of the combustor.

Figure 5:
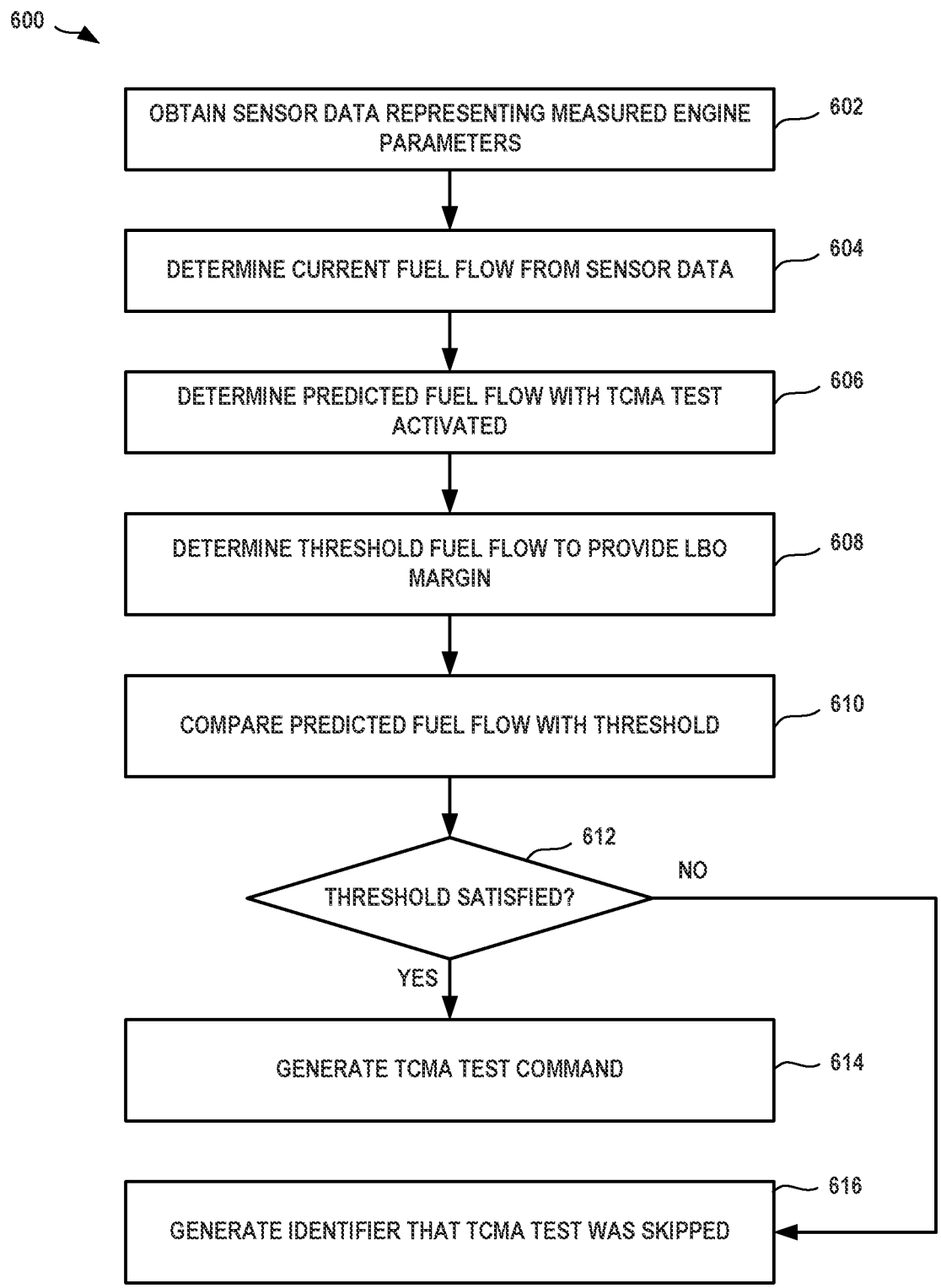
FIG. 5 is a flowchart describing a process of selectively activating a thrust control management accommodation test in accordance with example embodiments of the present disclosure.

FIG. 5 is a flowchart depicting a process 600 of selectively performing a thrust control system test based on a predicted fuel flow of a gas turbine engine. In example embodiments, process 600 may be performed by one or more computing devices implementing a flight management system and/or an engine control system. For example, process 600 may be performed by TCMA test unit 320 in some implementations. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (602), sensor data representing one or more measured engine parameters is obtained. For example, sensor data may be received from one or more sensors at a flight management system and/or engine control system. In another example, the sensor data may be obtained from a database or other storage location.

At (604), a current fuel flow is determined from the sensor data. In some implementations, the fuel flow may be represented by one or more of the engine parameters. In other examples, the fuel flow may be derived from the received engine parameters. In example embodiments, the fuel flow may be represented as a fuel flow rate or other measure of the fuel being supplied to the turbine engine.

At (606), a predicted fuel flow is determined based on the current fuel flow and a TCMA system test operation. For example, the current fuel flow can be used to predict a fuel flow that will result if a thrust control malfunction accommodation (TCMA) function is activated. In some implementations, the TCMA cutback function includes actuating a flow reduction device such as a flow reduction valve to reduce fuel flow to the turbine engine.

In some implementations, one or more models are used at block 606 to determine a predicted fuel flow rate. For example, various engine and or fuel system models may be used at block 606. In some examples, the TCMA test unit may input the current fuel flow into the one or more models and receive as output one or more predicted fuel flow values.

At (608), one or more thresholds are determined for comparison against the predicted fuel flow. In some embodiments, a constant threshold may be used at block 608. Accordingly block 608 may include accessing a predetermined threshold. In other examples, variable threshold can be used. For example, a variable threshold may include a plurality of thresholds that are based on different operating conditions of the turbine engine. The minimum fuel flow to provide sufficient LBO margin may vary based on the different operating conditions. Accordingly, a variable threshold may be used to accurately compare the predicted fuel flow and determine whether a potential blowout condition may occur. As such, block 608 may include determining one or more current engine parameters or other parameters to determine a current operating condition of the turbine engine. Based on the current operating condition, the appropriate threshold can be determined at block 608.

At (610), the predicted fuel flow is compared with the one or more thresholds determined at block 608. At (612), the system determines whether the one or more thresholds are satisfied. For example, block 612 may include determining whether the predicted fuel flow rate is at or above a minimum fuel flow rate. At (614), a TCMA test command is generated to initiate a TCMA test at the turbine engine if the predicted fuel flow satisfies the threshold. For example, the TCMA test unit may generate a TCMA test command and issue the command to a TCMA system at the engine control system of the aerial vehicle. In some implementations, one or more signals can be generated at block 614 and communicated from the TCMA test unit to the engine control system in order to actuate a flow reduction device incorporated within a TCMA system.

At (616), an identifier that the thrust control test was skipped can be generated if the threshold is not satisfied. The TCMA test can be skipped in response to the predicted fuel flow not satisfying the one or more thresholds. The predicted fuel flow may indicate that a potential blowout may occur if the TCMA test is activated. Reducing fuel flow to the turbine engine in accordance with the TCMA test may result in a fuel flow that is below a minimum level needed to provide sufficient lean blowout margin. An identifier can be generated and stored in order to track a number of TCMA tests that are skipped by the system. In this manner, a maintenance operation may be initiated if a predetermined number of test operations are skipped.

Although much of the present disclosure describes a fuel flow prediction process in order to selectively perform a thrust control test operation such as a TCMA test, the disclosed technology is not so limited. For example the disclosed process may be used to selectively perform any number of aerial vehicle operational tests or other operations. For example, a predicted fuel flow may be determined and compared against a threshold in order to determine whether to perform a test of any portion of the engine control system and/or fuel control system.

Figure 6:
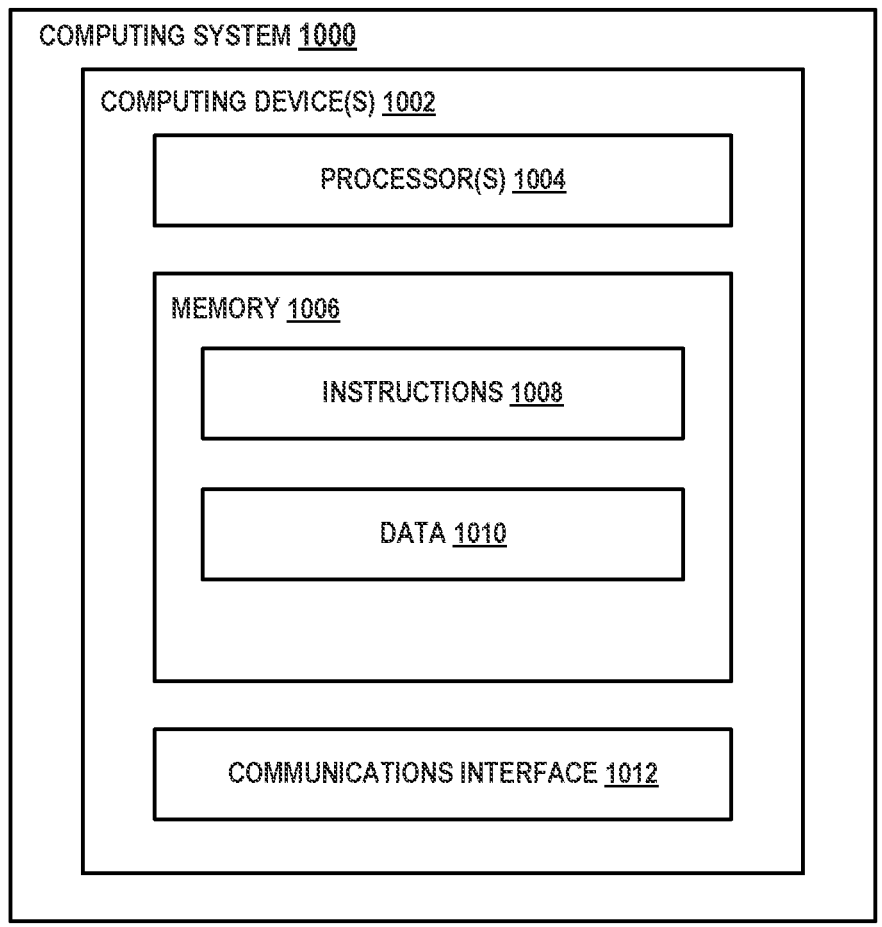
FIG. 6 depicts a block diagram of an example of a computing system.

FIG. 6 depicts a block diagram of an example computing system 1000 that can be used to implement methods and systems according to example embodiments of the present disclosure. Computing system 1000 may be used to implement a TCMA test unit 320, flight management system 20, vehicle control system 16, etc. as described herein. It will be appreciated, however, that computing system 1000 is one example of a suitable computing system for implementing the control systems and other computing elements described herein.

As shown, the computing system 1000 can include one or more computing device(s) 1002. The one or more computing device(s) 1002 can include one or more processor(s) 1004 and one or more memory device(s) 1006. The one or more processor(s) 1004 can include any suitable processing device, such as a microprocessor, microcontroller, integrated circuit, logic device, or other suitable processing device. The one or more memory device(s) 1006 can include one or more computer-readable media, including, but not limited to, non-transitory computer-readable media, RAM, ROM, hard drives, flash drives, or other memory devices.

The one or more memory device(s) 1006 can store information accessible by the one or more processor(s) 1004, including computer-readable instructions 1008 that can be executed by the one or more processor(s) 1004. The instructions 1008 can be any set of instructions that when executed by the one or more processor(s) 1004, cause the one or more processor(s) 1004 to perform operations. The instructions 1008 can be software written in any suitable programming language or can be implemented in hardware. In some embodiments, the instructions 1008 can be executed by the one or more processor(s) 1004 to cause the one or more processor(s) 1004 to perform operations, such as the operations for predicting fuel flow rates, including the generation of TCMA test commands and test skip identifiers as described above, and/or any other operations or functions of the one or more computing device(s) 1002.

The memory device(s) 1006 can further store data 1010 that can be accessed by the processors 1004. For example, the data 1010 can include sensor data such as engine parameters, model data, logic data, etc., as described herein. The data 1010 can include one or more table(s), function(s), algorithm(s), model(s), equation(s), etc. according to example embodiments of the present disclosure.

The one or more computing device(s) 1002 can also include a communication interface 1012 used to communicate, for example, with the other components of system. The communication interface 1012 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
one or more sensors configured to generate sensor data including one or more engine parameters of a turbine engine; and one or more processors configured to:
  determine a current fuel flow of the turbine engine;
  determine a predicted fuel flow of the turbine engine based on activation of a flow reduction valve of a fuel control system associated with the turbine engine;
  verify whether the predicted fuel flow satisfies at least one criteria associated with lean blowout of a combustor of the turbine engine;
  in response to verifying that the predicted fuel flow satisfies the at least one criteria associated with the lean blowout of the combustor of the turbine engine, activate the reduction valve of the fuel control system in response to the predicted fuel flow satisfying the at least one criteria; and
  in response to verifying that the predicted fuel flow fails to satisfy the at least one criteria associated with the lean blowout of the combustor of the turbine engine, skip activation of the reduction valve.

2. The system of claim 1, wherein the one or more processors are configured to:
  generate an identifier that the fuel control system was not tested in response to the predicted fuel flow not satisfying the at least one criteria.

3. The system of claim 1, wherein:
the at least one criteria includes a plurality of thresholds corresponding to a plurality of different engine parameter values;
verifying whether the predicted fuel flow satisfies the at least one criteria comprises comparing the predicted fuel flow to a first threshold of the plurality of thresholds in response to a first engine parameter value of the plurality of different engine parameter values and comparing the predicted fuel flow to a second threshold of the plurality of thresholds in response to a second engine parameter value of the plurality of different engine parameter values.

4. The system of claim 1, wherein:
the one or more processors are configured to obtain sensor data including a plurality of engine parameters of the one or more engine parameters;
the current fuel flow is represented by a first engine parameter of the one or more engine parameters;
the plurality of engine parameters comprises at least one additional engine parameter of the one or more engine parameters representing a fuel split ratio to two or more fuel nozzles, a fuel temperature, an engine core speed, or a high pressure compressor discharge pressure; and
determining the predicted fuel flow of the turbine engine is based at least in part on the at least one additional engine parameter.

5. The system of claim 1, wherein the one or more processors are configured to:
  activate the reduction valve to reduce a fuel flow rate associated with the turbine engine over a range of fuel metering valve positions.

6. The system of claim 1, further comprising:
a thrust control malfunction accommodation (TCMA) system including the flow reduction valve.

7. The system of claim 1, further comprising:
one or more aerial vehicles including the one or more sensors and the one or more processors.

8. The system of claim 1, further comprising a non-transitory computer-readable medium storing computer instructions, that when executed by the one or more processors, cause the one or more processors to perform operations, the operations comprising:
  determining the current fuel flow associated with the turbine engine;
  inputting the current fuel flow into one or more models to determine the predicted fuel flow of the turbine engine;
  determining if the predicted fuel flow satisfies at least one threshold criterion of the at least one criteria associated with a control malfunction system of the turbine engine; and
  testing the control malfunction system if the predicted fuel flow satisfies the at least one threshold criterion.

9. The system of claim 8, wherein the operations further comprise:
  generating an identifier that a test of the control malfunction system was skipped if the predicted fuel flow does not satisfy the at least one threshold criterion.

10. The system of claim 8, wherein:
the at least one threshold criterion includes a minimum fuel flow for a lean blowout margin; and
determining if the predicted fuel flow satisfies the at least one threshold criterion comprises determining whether the predicted fuel flow is at or above the minimum fuel flow.

11. The system of claim 8, wherein:
the at least one threshold criterion includes a plurality of thresholds corresponding to a plurality of different engine parameter values; and
determining if the predicted fuel flow satisfies the at least one threshold criterion comprises comparing the predicted fuel flow to a first threshold of the plurality of thresholds in response to a first engine parameter value of the plurality of different engine parameter values and comparing the predicted fuel flow to a second threshold of the plurality of thresholds in response to a second engine parameter value of the plurality of different engine parameter values.

12. The system of claim 8, wherein:
the operations further comprise receiving a plurality of engine parameters of the one or more engine parameters;
the current fuel flow is represented by a first engine parameter of the one or more engine parameters;
the plurality of engine parameters comprises at least one additional engine parameter of the one or more engine parameters representing a fuel split ratio to two or more fuel nozzles, a fuel temperature, an engine core speed, or a high pressure compressor discharge pressure; and
determining the predicted fuel flow of the turbine engine is based at least in part on the at least one additional engine parameter.

13. A non-transitory computer-readable medium storing computer instructions, that when executed by one or more processors, cause the one or more processors to perform operations, the operations comprising:
  receiving a plurality of engine parameters from one or more sensors;
  determining a current fuel flow of a turbine engine;
  determining a predicted fuel flow of the turbine engine based on activation of a flow reduction valve of a fuel control system associated with the turbine engine;
  verifying whether the predicted fuel flow satisfies at least one criteria associated with lean blowout of a combustor of the turbine engine;

in response to verifying that the predicted fuel flow satisfies the at least one criteria associated with the lean blowout of the combustor of the turbine engine, activating the reduction valve of the fuel control system in response to the predicted fuel flow satisfying the at least one criteria; and in response to verifying that the predicted fuel flow fails to satisfy the at least one criteria associated with the lean blowout of the combustor of the turbine engine, skipping activation of the reduction valve.

14. The non-transitory computer readable medium of claim 13, wherein the operations further comprise:

generating an identifier that a test of a control malfunction system was skipped if the predicted fuel flow rate does not satisfy the at least one criteria.

15. The non-transitory computer readable medium of claim 13, wherein the at least one criteria includes a minimum fuel flow for a lean blowout margin; and determining if the predicted fuel flow satisfies the at least one criteria comprises determining whether the predicted fuel flow is at or above the minimum fuel flow.

16. The non-transitory computer readable medium of claim 13, wherein:

the at least one criteria includes a plurality of thresholds corresponding to a plurality of different engine parameter values; and determining if the predicted fuel flow satisfies the at least one criteria comprises comparing the predicted fuel flow to a first threshold in response to a first engine parameter value and comparing the predicted fuel flow to a second threshold in response to a second engine parameter value.

17. The non-transitory computer readable medium of claim 13, wherein:

the current fuel flow is represented by a first engine parameter;

the plurality of engine parameters comprises at least one additional engine parameter representing a fuel split ratio to two or more fuel nozzles, a fuel temperature, an engine core speed, or a high pressure compressor discharge pressure; and determining the predicted fuel flow rate of the turbine engine is based at least in part on the at least one additional engine parameter.

* * * * *